(12) United States Patent
Miyauchi et al.

(10) Patent No.: US 8,481,440 B2
(45) Date of Patent: Jul. 9, 2013

(54) DIELECTRIC CERAMIC COMPOSITION, DIELECTRIC BODY, CERAMIC SUBSTRATE, ELECTRONIC COMPONENT, AND METHOD FOR PRODUCING DIELECTRIC BODY

(75) Inventors: Yasuharu Miyauchi, Tokyo (JP); Toshiyuki Suzuki, Tokyo (JP); Isao Kagomiya, Nagoya (JP); Hitoshi Ohsato, Nagoya (JP)

(73) Assignee: TDK Corporation, Chuo-ku, Tokyo (JP)

( * ) Notice: Subject to any disclaimer, the term of this patent is extended or adjusted under 35 U.S.C. 154(b) by 83 days.

(21) Appl. No.: 13/203,922

(22) PCT Filed: Mar. 1, 2010

(86) PCT No.: PCT/JP2010/053246
§ 371 (c)(1),
(2), (4) Date: Oct. 20, 2011

(87) PCT Pub. No.: WO2010/101114
PCT Pub. Date: Sep. 10, 2010

(65) Prior Publication Data
US 2012/0028787 A1     Feb. 2, 2012

(30) Foreign Application Priority Data
Mar. 3, 2009 (JP) ................. P2009-049308

(51) Int. Cl.
*C04B 35/111* (2006.01)
(52) U.S. Cl.
USPC ............................ 501/127; 501/153; 423/509
(58) Field of Classification Search
USPC ................................... 501/127, 153; 423/509
See application file for complete search history.

(56) References Cited

U.S. PATENT DOCUMENTS
3,070,421 A * 12/1962 Bayer .......................... 423/508
4,939,106 A     7/1990 Miyakoshi et al.
2011/0155987 A1 * 6/2011 Mizuguchi et al. ............... 257/2

FOREIGN PATENT DOCUMENTS
JP     59-203706       11/1984
JP     05105432     *   4/1993
JP     2641521        5/1997

* cited by examiner

*Primary Examiner* — Karl Group
(74) *Attorney, Agent, or Firm* — Drinker Biddle & Reath LLP

(57) ABSTRACT

An electronic component 100 which includes: a dielectric body (a ceramic substrate) 110 containing a dielectric ceramic composition containing $Al_2TeO_5$ as a main component; and terminals 120 each provided on a pair of opposed side surfaces of the dielectric body 110 is provided.

10 Claims, 5 Drawing Sheets

DIELECTRIC CERAMIC COMPOSITION, DIELECTRIC BODY, CERAMIC SUBSTRATE, ELECTRONIC COMPONENT, AND METHOD FOR PRODUCING DIELECTRIC BODY

TECHNICAL FIELD

The present invention relates to a dielectric ceramic composition, a dielectric body, a ceramic substrate, an electronic component, and a method for producing a dielectric body.

BACKGROUND ART

Recent years, electronic components have been demanded to have a larger capacity and to be downsized. Low temperature co-fired ceramics (LTCC) have been drawing attention as a printed wiring board material for electronic components. LTCC can be generally fired at or below 1000° C., which enables Ag and Cu having a low conductive resistance or their alloys to form a conductive pattern.

Using a glass component such as $SiO_2$ and $B_2O_3$ as a main component to enable sintering at low temperature in manufacturing LTCC has been proposed (for example, Patent Literature 1).

CITATION LIST

Patent Literature

Patent Literature 1: Japanese Patent No. 2641521

SUMMARY OF INVENTION

Technical Problem

However, when the glass component as described above is used as a main component for a dielectric ceramic composition, a quality factor (Q value) is reduced. Accordingly, a dielectric ceramic composition having a high quality factor while maintaining sinterability at low temperature has been desired.

The present invention has been made in view of the above-described circumstances. An object of the present invention is to provide a dielectric ceramic composition and a dielectric body which have a high Q·f value, and a ceramic substrate and an electronic component which include such a dielectric body. Another object of the present invention is to provide a method for producing a dielectric body capable of forming a dielectric body having a high Q·f value even at low sintering temperature.

Solution to Problem

To achieve the above objects, a dielectric ceramic composition comprising $Al_2TeO_5$ as a main component is provided according to an aspect of the present invention. The dielectric ceramic composition has a sufficiently high Q·f value because a content of a glass component is reduced. Also, the dielectric ceramic composition has a dielectric constant suitable for high-frequency components such as a filter. Thus, the dielectric ceramic composition is favorably used as a material for high-frequency components.

It is preferable that the dielectric ceramic composition comprises $TeO_2$ as an auxiliary component. $TeO_2$ is a low-melting-point oxide, and serves as a sintering additive. Thus, by containing $TeO_2$ as the auxiliary component, a dielectric ceramic composition having excellent sintering performance can be obtained.

According to another aspect of the present invention, a dielectric body comprising the above-described dielectric ceramic composition is provided. Since the dielectric body comprises the dielectric ceramic composition having the above-described features, a content of a glass component is sufficiently reduced and a Q·f value is sufficiently high. The dielectric body also has a dielectric constant suitable for high-frequency components such as a filter. Thus, the dielectric body is favorably used for high-frequency components.

According to yet another aspect of the present invention, a ceramic substrate and an electronic component comprising the above-described dielectric body are provided. Since the ceramic substrate and the electronic component have the dielectric body having the above-described features, they have high Q·f values and are favorably used as high-frequency components.

According to yet another aspect of the present invention, a method for producing a dielectric body including $Al_2O_3$ as a main component comprises a calcining step of calcining a mixture containing $Al_2O_3$ and $TeO_2$ to obtain $Al_2TeO_5$ and a firing step of adding $TeO_2$ to $Al_2TeO_5$, molding and sintering to obtain a sintered body.

According to this method, a dielectric body having a high Q·f value and a dielectric constant suitable for high-frequency components can be obtained at sufficiently low firing temperature. Also, since the dielectric body can be obtained by sintering at sufficiently low firing temperature, inexpensive Ag or Cu can be used as a material for wiring patterns in producing the ceramic substrate, the electronic component, or the like. Thus, the manufacturing cost for the dielectric body can be considerably reduced.

Further, it is preferable that the method comprises a step of annealing the sintered body. By annealing the sintered body, a dielectric body having a higher Q·f value can be obtained.

Advantageous Effects of Invention

According to the present invention, a dielectric ceramic composition and a dielectric body which have a high Q·f value, and a ceramic substrate and an electronic component which include such a dielectric body can be provided. Also, a method for producing a dielectric body capable of forming a dielectric body having a high Q·f value even at low sintering temperature can be provided.

According to the method for producing the dielectric body of the present invention, the dielectric body can be produced by sintering at sufficiently low temperature. Therefore, Ag or Cu can be used as a material for an electrode pattern. Thus, a ceramic substrate and an electronic component which include the dielectric body having a high Q·f value can be produced at low cost.

DESCRIPTION OF EMBODIMENTS

Figure 1:
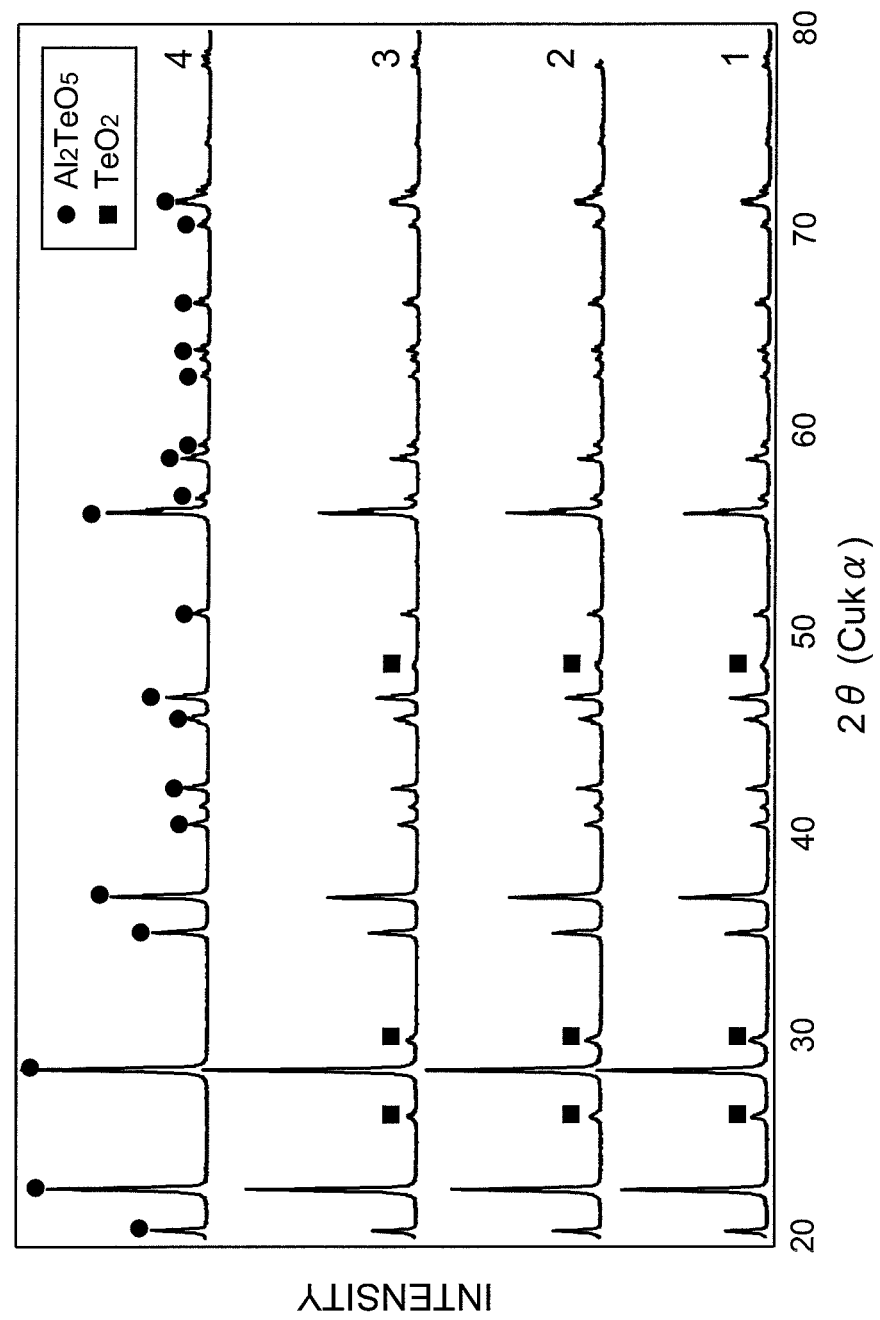
FIG. 1 is an XRD (X-ray diffraction) chart showing variation with time for firing a dielectric body obtained by a producing method according to an embodiment.

A dielectric ceramic composition, a dielectric body, a ceramic substrate, and an electronic component according to preferred embodiments will be described below with reference to the accompanying drawings.

The dielectric body according to the embodiment comprises a dielectric ceramic composition containing $Al_2TeO_5$ as a main component and $TeO_2$ as an auxiliary component. Here, the "main component" means that its content relative to the entire dielectric ceramic composition is 50 mass % or more, while the "auxiliary component" means that its content relative to the entire dielectric ceramic composition is less than 50 mass %.

To prepare a dielectric ceramic composition having a higher Q·f value, the content of $Al_2TeO_5$ in the dielectric ceramic composition is preferably 50 to 100 mass %, more preferably 60 to 100 mass %. When the content of $Al_2TeO_5$ is less than 50 mass %, it tends to be difficult to obtain a sufficiently high Q·f value.

In the dielectric body which is a sintered body, $Al_2TeO_5$ mainly forms crystal grains of the sintered body. On the other hand, $TeO_2$ may exist mainly in grain boundaries of the sintered body. $TeO_2$ is easily molten in liquid phase by heating, and accordingly, has a function for progressing sintering of the dielectric ceramic composition. Thus, by containing 10 to 25 mass % of $TeO_2$, a dielectric ceramic composition having sufficiently excellent sintering performance and a sufficiently high Q·f value can be obtained. Incidentally, $TeO_2$ may be dissolved in $Al_2TeO_5$ forming crystal grains, or may exist as different crystals separately from crystals of $Al_2TeO_5$ in the crystal grains.

The dielectric body according to the embodiment has a dielectric constant suitable for high-frequency components and has a high Q·f value. Thus, the dielectric body according to the embodiment can be favorably used for high-frequency components such as a ceramic substrate and an electronic component.

Next, a method for producing the dielectric body according to the embodiment of the present invention will be explained below. The method for producing the dielectric body according to the embodiment comprises: a mixing step of mixing $Al_2O_3$ and $TeO_2$ to prepare a mixture; a calcining step of calcining the prepared mixture to obtain $Al_2TeO_5$; an adding step of adding $TeO_2$ to $Al_2TeO_5$ and mixing them to prepare a mixture of $Al_2TeO_5$ and $TeO_2$; a firing step of molding the mixture of $Al_2TeO_5$ and $TeO_2$ and firing it to obtain a sintered body; and an annealing step of annealing the sintered body to obtain a dielectric body. These steps will be explained in detail below.

In the mixing step, for example, a commercially-available $Al_2O_3$ powder and a commercially-available $TeO_2$ powder are mixed at a molar ratio of 1:1 to prepare a mixture. For obtaining a uniformly mixed mixture, it is preferable that ethanol is added to the $Al_2O_3$ powder and the $TeO_2$ powder and they are wet-mixed together. When they are wet-mixed, it is preferable that the mixture is sufficiently dried using a normal dryer or the like before the calcining step.

In the calcining step, the mixture prepared in the mixing step is calcinated using a commercially-available electric furnace or the like, and $Al_2O_3$ and $TeO_2$ are reacted to obtain $Al_2TeO_5$. For shortening the step while progressing the reaction sufficiently, it is preferable that the calcining temperature is 550 to 650° C. and the calcining time is 5 to 20 hours. This calcination can be carried out in air atmosphere. When the calcining temperature exceeds 650° C., $TeO_2$ may be evaporated and thus the deviation of composition tends to occur.

In the adding step, the commercially-available $TeO_2$ powder is added to $Al_2TeO_5$ obtained in the calcining step. By changing an additive amount of the $TeO_2$ powder relative to $Al_2TeO_5$, a composition of a dielectric ceramic composition which is finally obtained can be adjusted. For obtaining a high standard in both of high sintering performance and a high Q·f value of the obtained dielectric body, the additive amount of the $TeO_2$ powder is preferably 10 to 50 mass % relative to whole $Al_2TeO_5$, more preferably 20 to 50 mass %, further preferably 30 to 45 mass %.

Similarly to the mixing step described above, it is preferable that ethanol is added to $Al_2TeO_5$ and the $TeO_2$ powder, and that those are wet-mixed together by a ball mill or the like. The $TeO_2$ powder added in this step also serves as a sintering additive in the later-described firing step. By adding the $TeO_2$ powder, the generation of phases other than $Al_2TeO_5$ and $TeO_2$ can be suppressed and a sufficiently dense sintered body can be obtained even at low firing temperature. Incidentally, when the wet-mixing is performed, it is preferable that the mixture of $Al_2TeO_5$ and $TeO_2$ is dried using a normal dryer or the like before the later-described firing step.

In the firing step, the mixture of $Al_2TeO_5$ and $TeO_2$ is initially molded to have a predetermined shape by a normal molding method such as uniaxial press or cold isostatic press (CIP) to obtain a molded body. The obtained molded body is fired in air atmosphere to prepare a sintered body (dielectric body). For progressing the sintering sufficiently while maintaining the lowest possible firing temperature, the firing temperature is preferably 750 to 950° C., more preferably 800 to 950° C., further preferably 850 to 950° C. The firing time may be 1 to 20 hours, for example. Since $TeO_2$ is a low-melting-point oxide, a dense sintered body can be obtained at low firing temperature as described above.

The sintered body obtained in the firing step comprises the above-described dielectric ceramic composition, and can be used as a dielectric body for a ceramic substrate or an electronic component. This dielectric body contains $Al_2TeO_5$ as a main component and $TeO_2$ as an auxiliary component. Thus, the dielectric body has a dielectric constant suitable for high-frequency components and a high Q·f value. For example, the dielectric body is favorably used for electronic components such as a filter. To further improve high-frequency characteristics of the Q·f value and the like, it is preferable that the sintered body obtained in the firing step is subjected to the later-described annealing treatment.

In the annealing step, the sintered body is heated in air atmosphere for 1 to 100 hours at temperature lower than the firing temperature in the firing step (annealing temperature). Accordingly, the composition of the sintered body is further homogenized, and thus a dielectric body having further excellent high-frequency characteristics can be obtained. The annealing temperature is preferably 200 to 900° C., more preferably 300 to 800° C.

Through the above-described steps, a dielectric body comprising a dielectric composition having a dielectric constant suitable for high-frequency components and a sufficiently high Q·f value can be obtained. Incidentally, the dielectric body according to this embodiment preferably has the density of 4.7 g/cm$^3$ or more, more preferably 4.75 g/cm$^3$ or more. When the density of the dielectric body is less than 4.7 g/cm$^3$, the sintering may not proceed sufficiently and the sufficiently excellent high-frequency characteristics tend to be impaired.

A ratio of $Al_2TeO_5$ and $TeO_2$ in the dielectric body and the dielectric ceramic composition according to the embodiment can be adjusted by changing the firing temperature and the firing time in the firing step. For example, when the firing time is lengthened or the firing temperature is raised, a volatilization volume of $TeO_2$ is increased and thus the ratio of $TeO_2$ relative to $Al_2TeO_5$ tends to be small.

FIG. 1 is an XRD (X-ray diffraction) chart showing variation with the time for firing dielectric bodies obtained by the producing method according to the embodiment. The dielectric bodies indicated by the charts 1 to 4 are respectively obtained by being fired at the firing temperature of 900° C. The firing time is varied from 1 to 10 hours. The charts 1, 2, 3, and 4 are XRD charts of the dielectric bodies obtained by being fired for 1 hour, 3 hours, 5 hours, and 10 hours, respectively.

As shown in FIG. 1, the content of $TeO_2$ is decreased as the firing time is longer. The chart 4 shows that a dielectric ceramic composition composed of only $Al_2TeO_5$ is obtained. The composition of each dielectric body can be studied by XRD diffraction.

By the above-described method for producing the dielectric body, a dielectric body having high-frequency characteristics at sufficiently low temperature can be obtained. Thus, the dielectric body obtained by the above-described producing method is favorably used for a ceramic substrate (LTCC substrate), an electronic component, or the like.

Next, the electronic component according to the embodiment of the present invention and its producing method will be explained below.

Figure 2:
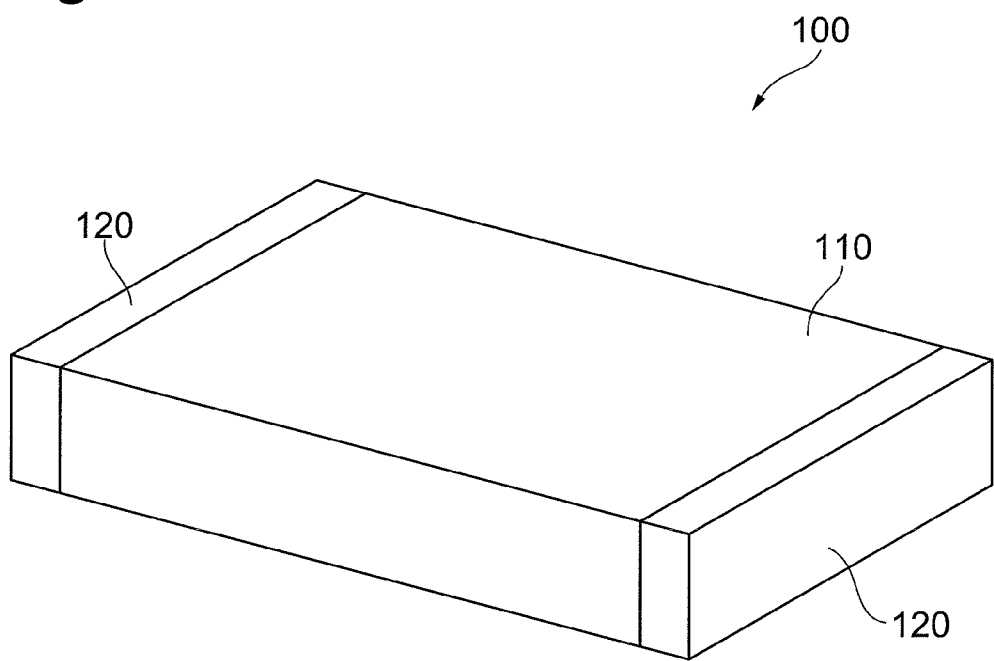
FIG. 2 is a perspective view of an electronic component according to the embodiment of the present invention.

FIG. 2 is a perspective view of the electronic component according to the embodiment of the present invention. In an electronic component 100 shown in FIG. 2, terminals 120 are provided on a pair of opposed side surfaces of a dielectric body (ceramic substrate) 110. The terminals 120 enclose the vicinity of end portions of the dielectric body 110 from the side surfaces. Examples of an electronic component having such a shape include a laminated ceramic capacitor and a laminated coil.

Figure 3:
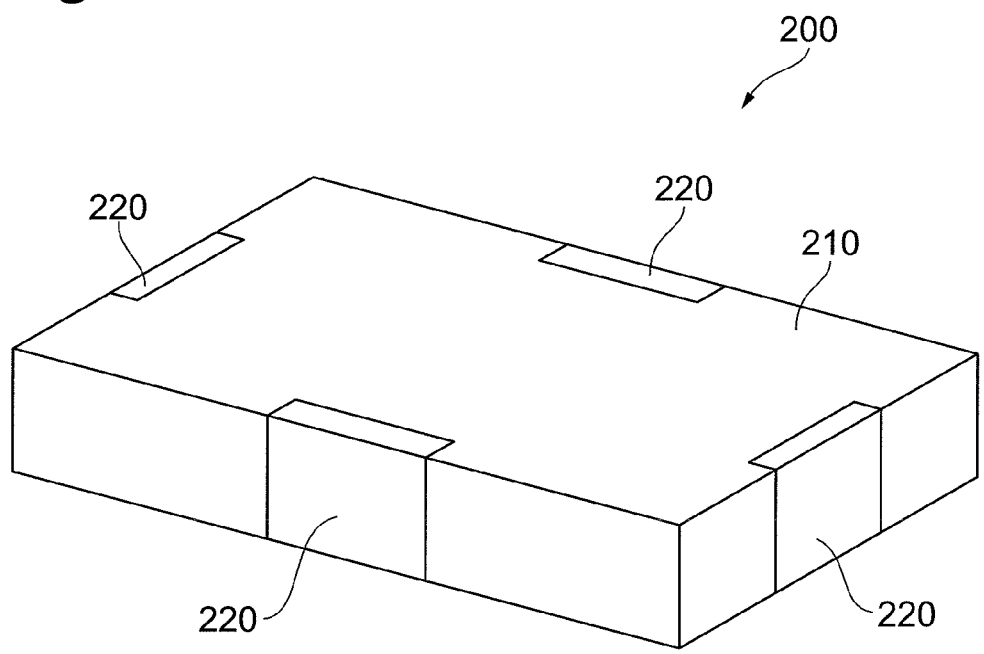
FIG. 3 is a perspective view of an electronic component according to another embodiment of the present invention.

FIG. 3 is a perspective view of an electronic component according to another embodiment of the present invention. In an electronic component 200 shown in FIG. 3, one terminal 220 is provided on each of four side surfaces of a dielectric body (ceramic substrate) 210. The terminals 220 provided on a pair of opposed side surfaces of the dielectric body 210 are opposed to each other. Examples of an electronic component having such a shape include a laminated low-pass filter, a laminated high-pass filter, a laminated band-pass filter, a laminated balun, a laminated coupler, and the like.

Figure 4:
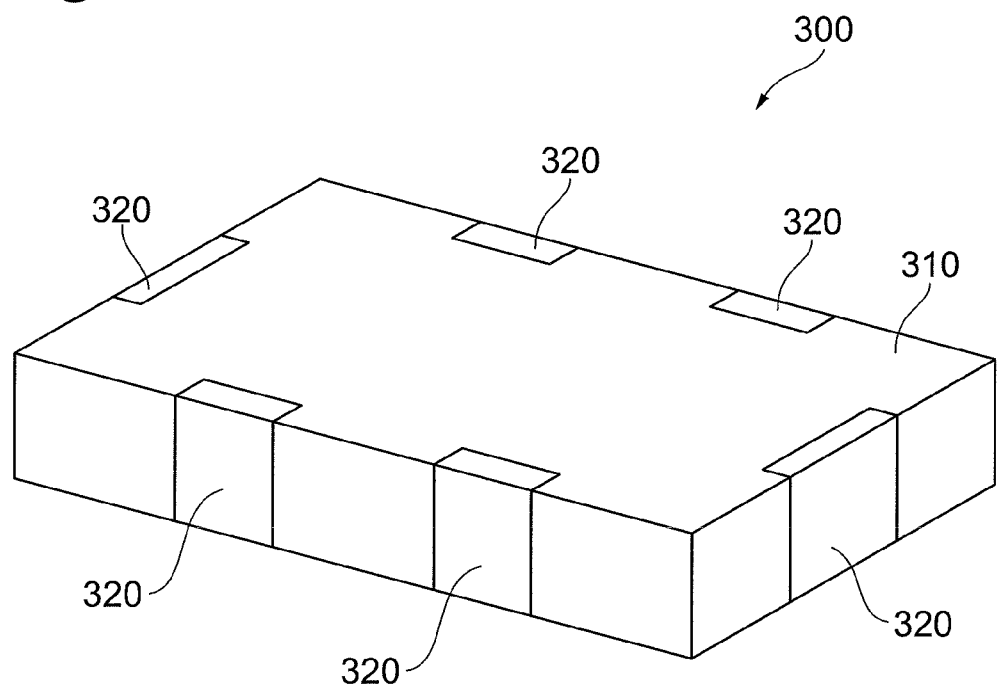
FIG. 4 is a perspective view of an electronic component according to further another embodiment of the present invention.

FIG. 4 is a perspective view of an electronic component according to further another embodiment of the present invention. In an electronic component 300 shown in FIG. 4, one terminal 320 is provided on each of one pair of opposed side surfaces out of four side surfaces of a dielectric body (ceramic substrate) 310, and two terminals 320 are provided on each of another pair of opposed side surfaces. The terminal 320 on each side surface is formed to be opposed to the terminal 320 on the opposed side surface. Examples of an electronic component having such a shape include a laminated low-pass filter, a laminated high-pass filter, a laminated band-pass filter, a laminated balun, a laminated coupler, and the like.

The electronic components 100, 200, and 300 may have a structure in which an internal electrode is formed in the dielectric bodies (ceramic substrate) 110, 210, and 310 and an end of the internal electrode is connected to the terminals 120, 220, and 320 provided on the side surfaces of the dielectric bodies 110, 210, and 310. An electronic component having various different characteristics can be obtained depending on the shape of the internal electrode, the connecting method, or the like. The dielectric bodies 110, 210, and 310 comprises the dielectric ceramic composition having the above-described characteristics. Since the dielectric bodies 110, 210, and 310 is fired at low temperature and sintered, inexpensive Ag or Cu can be used for the internal electrode and the terminals.

The electronic components 100, 200, and 300 can be produced by a method as follows. Firstly, a mixture of $Al_2TeO_5$ and $TeO_2$ is prepared in the same manner as the above-described method for producing the dielectric body. An organic vehicle is added to the mixture as needed to prepare a paste, and the paste is applied on a base material film such as polyethylene terephthalate. After the application, the organic vehicle is removed by drying and a green sheet containing $Al_2TeO_5$ and $TeO_2$ is formed. Incidentally, the organic vehicle is prepared by dissolving a binder in an organic solvent. Terpineol, butyl carbitol, acetone, toluene, isopropyl alcohol or the like may be used as the solvent. Ethyl cellulose, polyvinyl butyral or the like may be used as the binder. Further, the organic vehicle may contain a plasticizer such as di-n-butylphthalate.

A conductive paste containing Ag or Cu is applied on the formed green sheet to from an internal electrode having a predetermined shape. A plurality of green sheets on which the conductive paste is applied are prepared as needed and laminated to obtain a laminated body. Further, the conductive paste is applied on the laminated body to form the terminals 120, 220, and 320 each having a predetermined shape.

Subsequently, the organic vehicle is removed from the conductive paste by drying, and the same steps as the firing step and the annealing step of the above-described method for producing the dielectric body are performed. Accordingly, the electronic components 100, 200, and 300 in which the internal electrode is formed in the dielectric bodies 110, 210, and 310 and the terminals 120, 220, and 320 are provided on the side surfaces of the dielectric bodies 110, 210, and 310 can be obtained.

The preferred embodiments of the present invention are described above, but the present invention is not limited to the embodiments.

EXAMPLES

The present invention will be explained in detail below with reference to Examples and a Comparative Example. However, the present invention is not limited to the Examples as described below.

Example 1

<Production of Dielectric Body>
(Mixing Step)

A commercially-available $Al_2O_3$ powder (purity of 99.99 mass %) and $TeO_2$ powder (purity of 99.9 mass %) were weighed to have a molar ratio of 1:1. The weighed $Al_2O_3$ powder, $TeO_2$ powder, and ethanol were wet-mixed by a ball mill for 24 hours. Subsequently, the ethanol was removed by drying to obtain a mixture containing the $Al_2O_3$ powder and the $TeO_2$ powder.

(Calcining Step)

Next, the mixture was calcined by heating at 620° C. for 10 hours in air atmosphere to obtain a calcined body ($Al_2TeO_5$).

(Adding Step)

The $TeO_2$ powder (purity of 99.9 mass %) and ethanol were added to the obtained calcined body and wet-mixed by a ball mill. An additive amount of the $TeO_2$ powder was 35 mass % relative to a whole amount of $Al_2TeO_5$.

(Molding Step)

The mixture obtained by wet-mixing was uniaxially pressed under the pressure of 200 MPa to prepare a molded body having a columned shape (diameter: 12 mm).

(Firing Step)

The molded body was fired using an electric furnace at 900° C. for 2 hours in air atmosphere to obtain a dielectric body (sintered body) comprising a dielectric ceramic composition. This was a dielectric body according to Example 1.

<Evaluation>

(Composition Analysis)

The composition of the dielectric body was analyzed by XRD. Compounds detected by XRD are shown in Table 1.

(High-Frequency Characteristics Analysis)

The high-frequency characteristics of the produced dielectric body were analyzed in compliance with JIS R 1627. Specifically, a resonant frequency f0, a Q·f value, a dielectric constant $\in_r$, and a temperature coefficient of the resonant frequency $\tau_f$ were measured using a network analyzer as a measuring device. The measurement results are shown in Table 1.

(Density Measurement)

The density of the produced dielectric body was calculated from a dimension of the column and a measurement value of the mass. The result is shown in Table 1.

Examples 2 to 13

Dielectric bodies were produced in the same manner as Example 1 except that an additive amount of $TeO_2$ in the adding step and a firing time in the firing step were changed as shown in Table 1. These were dielectric bodies according to Examples 2 to 13. Each dielectric body was evaluated in the same manner as Example 1. The evaluation results are shown in Table 1.

Example 14

The dielectric body according to Example 5 was subjected to annealing treatment by being heated at 750° C. for 24 hours in air atmosphere. It was a dielectric body according to Example 14. This dielectric body was evaluated in the same manner as Example 1. The evaluation results are shown in Table 1.

Example 15

The dielectric body according to Example 5 was subjected to annealing treatment by being heated at 750° C. for 36 hours in air atmosphere. It was a dielectric body according to Example 15. The dielectric body was evaluated similarly to the example 1. The evaluation results are shown in Table 1.

Comparative Example 1

A dielectric body was produced in the same manner as Example 1 except that the calcining step was not conducted. Specifically, a mixture containing $Al_2O_3$ powder and $TeO_2$ powder was molded and fired to produce the dielectric body. Then, the dielectric body was evaluated in the same manner as Example 1. The evaluation results are shown in Table 1.

TABLE 1

|  | $TeO_2$ additive amount (mass %) | firing time (time) | XRD analysis | f0 (GHz) | Q·f (GHz) | $\in_r$ | $\tau_f$ (ppm/° C.) | density (g/cm³) |
|---|---|---|---|---|---|---|---|---|
| Example 1 | 35 | 2 | $Al_2TeO_5$, $TeO_2$ | 13.0 | 14653 | 9.8 | −75.4 | 4.91 |
| Example 2 | 35 | 4 | $Al_2TeO_5$, $TeO_2$ | 13.8 | 16927 | 9.4 | — | 4.97 |
| Example 3 | 35 | 7 | $Al_2TeO_5$, $TeO_2$ | 13.8 | 18840 | 9.3 | — | 4.92 |
| Example 4 | 35 | 10 | $Al_2TeO_5$, $TeO_2$ | 13.9 | 18866 | 9.1 | — | 4.80 |
| Example 5 | 40 | 2 | $Al_2TeO_5$, $TeO_2$ | 13.1 | 13289 | 9.9 | −63.3 | 4.89 |
| Example 6 | 40 | 3 | $Al_2TeO_5$, $TeO_2$ | 13.3 | 14843 | 10.2 | −62.2 | 4.98 |
| Example 7 | 40 | 4 | $Al_2TeO_5$, $TeO_2$ | 13.7 | 15583 | 9.2 | −63.5 | 4.94 |
| Example 8 | 40 | 5 | $Al_2TeO_5$, $TeO_2$ | 14.5 | 16845 | 9.7 | −60.2 | 4.93 |
| Example 9 | 40 | 7 | $Al_2TeO_5$, $TeO_2$ | 13.8 | 17108 | 9.4 | — | 4.95 |
| Example 10 | 40 | 10 | $Al_2TeO_5$, $TeO_2$ | 13.9 | 18062 | 9.4 | — | 4.99 |
| Example 11 | 45 | 2 | $Al_2TeO_5$, $TeO_2$ | 13.1 | 11937 | 10.0 | −64.6 | 4.93 |
| Example 12 | 45 | 6 | $Al_2TeO_5$, $TeO_2$ | 13.7 | 13204 | 9.5 | — | 4.95 |
| Example 13 | 50 | 2 | $Al_2TeO_5$, $TeO_2$ | 13.5 | 11588 | 9.8 | −62.4 | 4.76 |
| Example 14 | 40 | 2 | $Al_2TeO_5$, $TeO_2$ | 13.3 | 24325 | 10.2 | — | 5.08 |
| Example 15 | 40 | 2 | $Al_2TeO_5$, $TeO_2$ | 13.3 | 31238 | 10.3 | — | 5.02 |
| Comparative Example 1 | 35 | 2 | $Al_2O_3$, glass | 13.0 | 2600 | 9.2 | — | 4.85 |

In the table, "—" means that the measurement was not conducted.

Each of the dielectric bodies according to Examples 1 to 15 comprised a dielectric ceramic composition containing $Al_2TeO_5$ as a main component and $TeO_2$ as an auxiliary component. Each of the dielectric bodies according to Examples 1 to 15 has a dialectic constant suitable for high-frequency components and a high Q·f value.

Especially, the dielectric bodies according to Examples 14 and 15 subjected to annealing treatment had high Q·f values. On the other hand, the dielectric body according to Comparative Example 1 has a Q·f value which was considerably lower than those of the dielectric bodies according to Examples 1 to 15.

Figure 5:
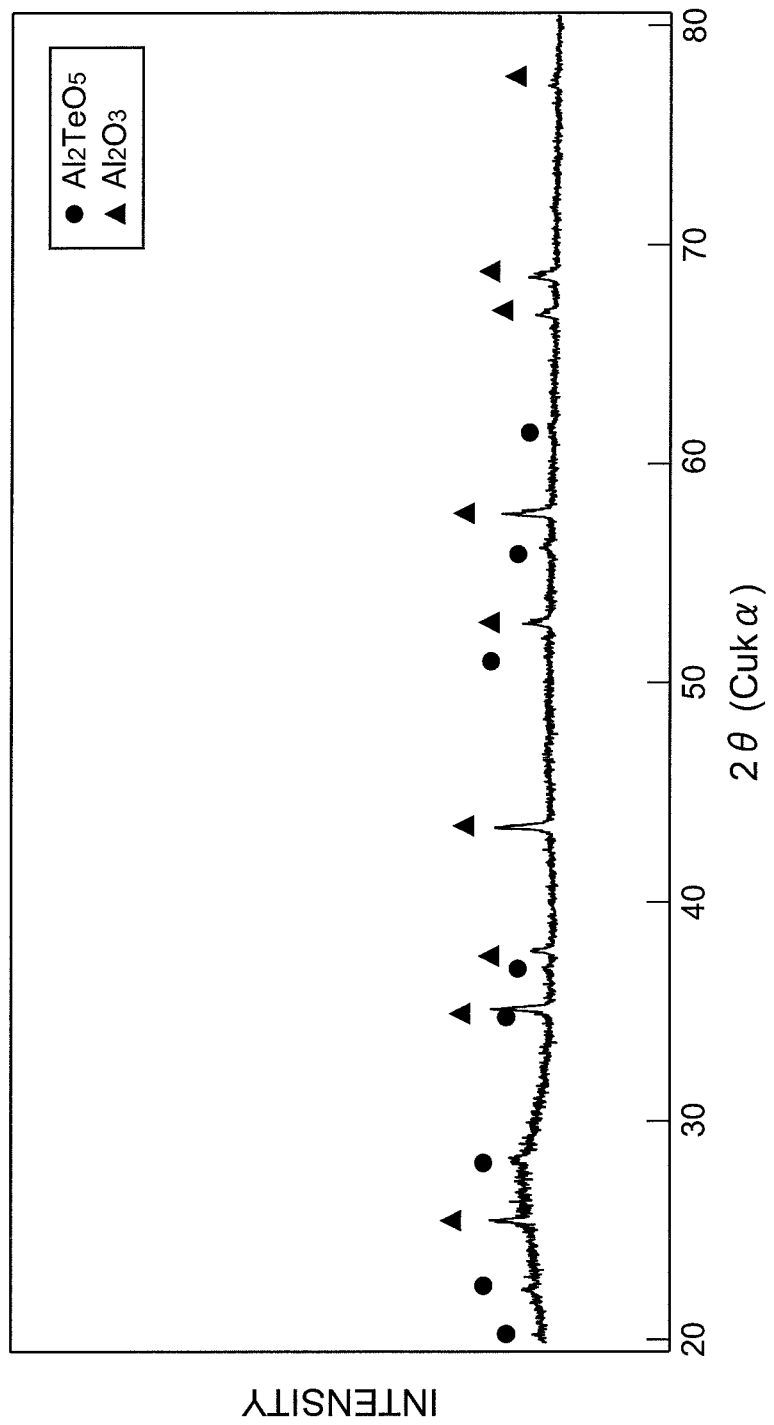
FIG. 5 is an XRD chart showing an XRD measurement result of a sintered body according to Comparative Example 1.

FIG. 5 is an XRD chart showing an XRD measurement result of the dielectric body according to Comparative Example 1. As shown in FIG. 5, when the dielectric body was prepared without conducting the calcining step, a dielectric ceramic composition containing $Al_2TeO_5$ as a main component was not obtained and a large amount of unreacted $Al_2O_3$ was remained.

Also, in the XRD chart shown in FIG. 5, it is confirmed that the intensity was increased at a low angle side of 2θ. This phenomenon is called a halo, which is specific to an amorphous glass. It shows that a glass phase derived from $TeO_2$ existed in the dielectric body according to Comparative Example 1. The Q·f value of the dielectric body according to Comparative Example 1 was low because of the existence of the glass phase.

Industrial Applicability

According to the present invention, the dielectric ceramic composition and the dielectric body which have a high Q·f value, and the ceramic substrate and the electronic component which include such a dielectric body can be provided. Also, the method for producing the dielectric body capable of forming the dielectric body having a high Q·f value even at low sintering temperature can be provided.

REFERENCE SIGNS LIST 100, 200, 300 . . . electronic components, 110, 210, 310 . . . dielectric bodies, 120, 220, 320 . . . terminals.

The invention claimed is:

1. A dielectric ceramic composition comprising $Al_2TeO_5$ as a main component.

2. The dielectric ceramic composition according to claim 1, comprising $TeO_2$ as an auxiliary component.

3. A dielectric body comprising the dielectric ceramic composition according to claim 1.

4. A ceramic substrate comprising the dielectric body according to claim 3.

5. An electronic component comprising the dielectric body according to claim 3.

6. A method for producing a dielectric body comprising a dielectric ceramic composition containing $Al_2TeO_5$ as a main component, comprising:
   a calcining step of calcining a mixture containing $Al_2O_3$ and $TeO_2$ to obtain $Al_2TeO_5$; and
   a firing step of adding $TeO_2$ to $Al_2TeO_5$, molding and sintering to obtain a sintered body.

7. The method for producing the dielectric body according to claim 6, comprising the step of annealing the sintered body.

8. A dielectric body comprising the dielectric ceramic composition according to claim 2.

9. A ceramic substrate comprising the dielectric body according to claim 8.

10. An electronic component comprising the dielectric body according to claim 8.

* * * * *